March 5, 1957 C. W. VOGT 2,783,922
DRIVE SYSTEM FOR PLASTIC METERING APPARATUS AND THE LIKE
Original Filed March 29, 1950 3 Sheets-Sheet 1

INVENTOR.
CLARENCE W. VOGT
BY
ATTORNEYS

March 5, 1957 C. W. VOGT 2,783,922
DRIVE SYSTEM FOR PLASTIC METERING APPARATUS AND THE LIKE
Original Filed March 29, 1950 3 Sheets-Sheet 2

INVENTOR.
CLARENCE W. VOGT
BY
ATTORNEYS

March 5, 1957 C. W. VOGT 2,783,922
DRIVE SYSTEM FOR PLASTIC METERING APPARATUS AND THE LIKE
Original Filed March 29, 1950 3 Sheets-Sheet 3

INVENTOR.
CLARENCE W. VOGT
BY
Campbell, Brumbaugh, Free & Graves
ATTORNEYS

United States Patent Office

2,783,922
Patented Mar. 5, 1957

2,783,922

DRIVE SYSTEM FOR PLASTIC METERING APPARATUS AND THE LIKE

Clarence W. Vogt, Norwalk, Conn.

Original application March 29, 1950, Serial No. 152,549. Divided and this application August 11, 1953, Serial No. 373,578

9 Claims. (Cl. 222—368)

This invention relates to mechanical drive systems and more particularly to a drive system adapted to afford recurring and phased variations in the output speeds of a plurality of driven members during each operating cycle so as to achieve continuous infeed of plastic material in a metering apparatus.

This application is a division of the applicant's copending application, Serial No. 152,549, filed March 29, 1950, entitled "Producing Measured Plastic Masses," and an improvement over the subject matter disclosed in the applicant's copending application, Serial No. 123,575, filed October 26, 1949, entitled "Apparatus for and Method of Producing Plastic Masses."

In the said copending applications there is disclosed apparatus for producing measured masses of plastic material, the present invention being concerned with the drive system and associated parts which may be used with this apparatus or in other apparatus in which its unique action might be used to advantage.

One object of the invention, therefore, is to provide means for facilitating continuous and uniform infeed of a plastic material in a metering system.

Another object of the invention is to provide a drive system affording intracycle speed variations.

Still another object of the invention is to provide a drive system by means of which a plurality of rotary members may be driven with speed variations which bear a preestablished out of phase relationship to one another.

The invention may be embodied in apparatus in which two or more work output members, preferably rotary, are driven through individual speed-controlling drives from a common source. The output members may be formed with plastic-receiving pockets which are successively exposed to filling and discharge ports, and pistons, driven in timed relation to the rotary movement, may be mounted within the pockets to control the entry and discharge of the plastic material.

Each drive may include a gear train having driving and driven gear means, at least one of which is mounted to partake of two driving motions such as rotary and rectilinear which are combined successively additively and subtractively in accordance with a preestablished control pattern so as to vary the absolute speeds as well as the relative speeds of the output members. The movements of the output members are phased so that while one is accelerated the other is decelerated, thereby enabling the pockets to pick up successively, discrete masses of plastic material from a continuous infeed flow.

The invention in a preferred embodiment is described in detail below having reference to the accompanying drawings, in which.

Figure 1:
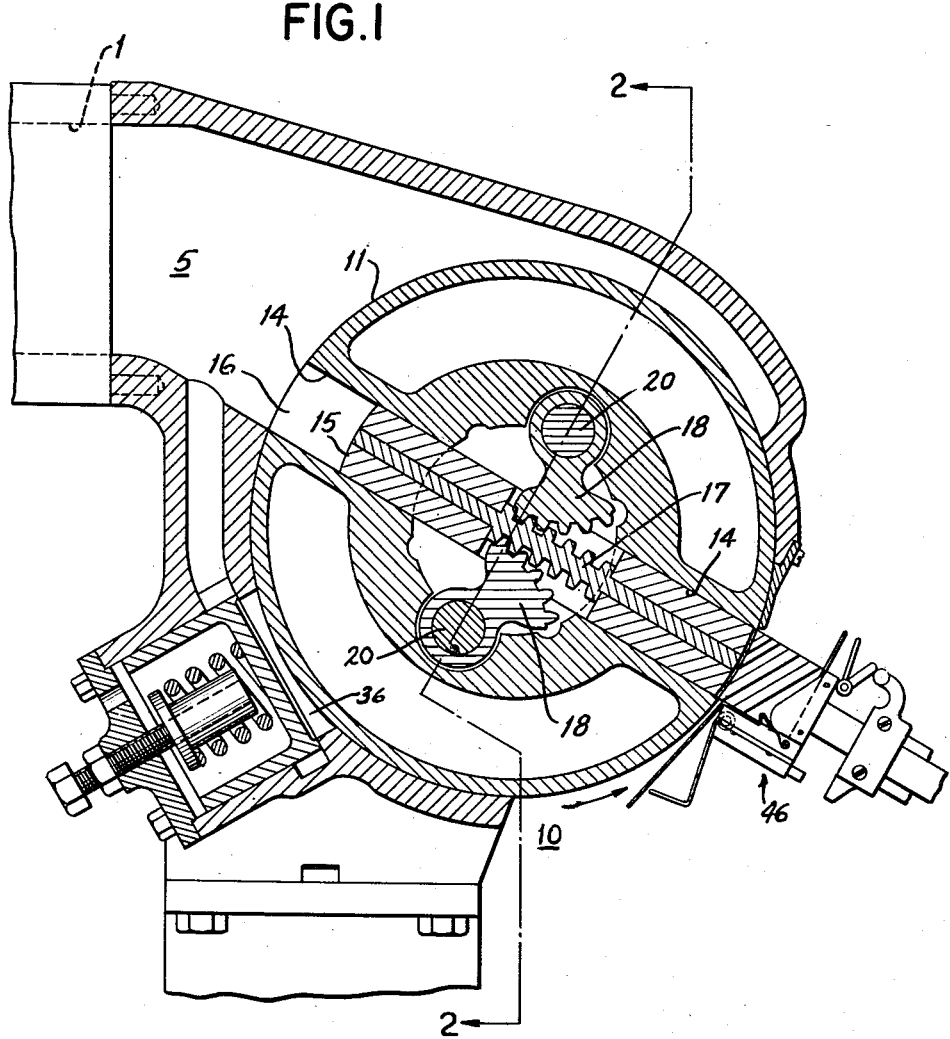
Figure 1 is a view in vertical section of a portion of a plastic metering apparatus.
Figure 2:
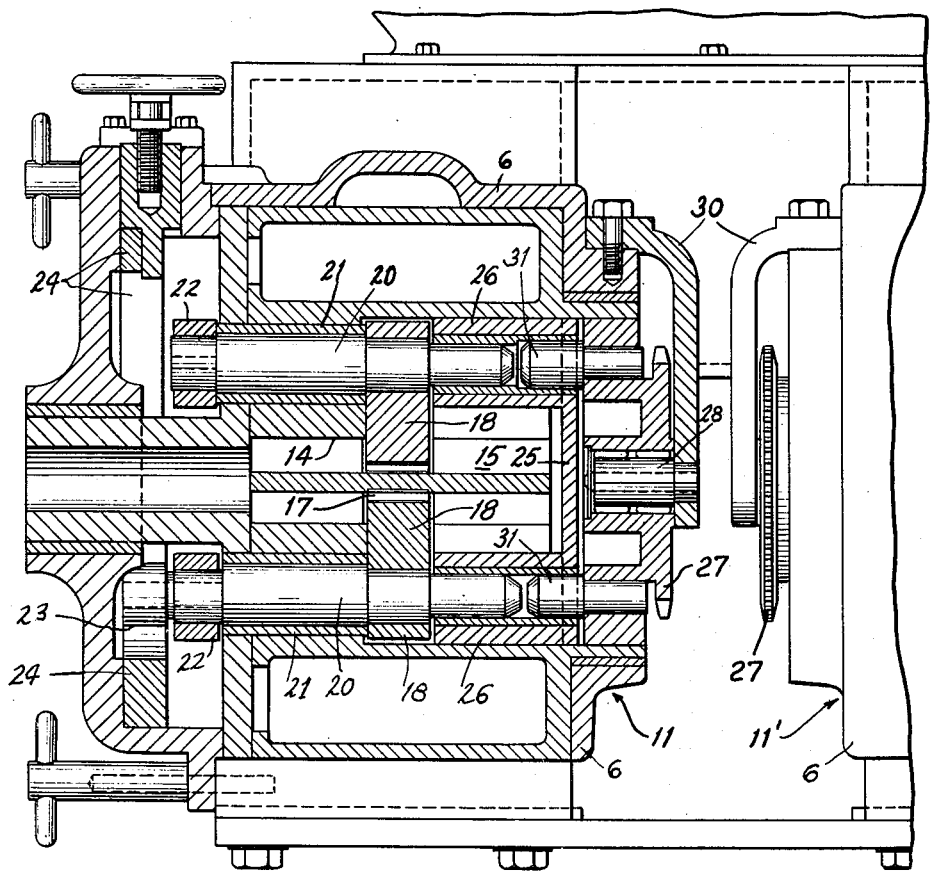
Figure 2 is a view in section taken along the crooked line 2—2 of Figure 1 looking in the direction of the arrows.
Figure 3:
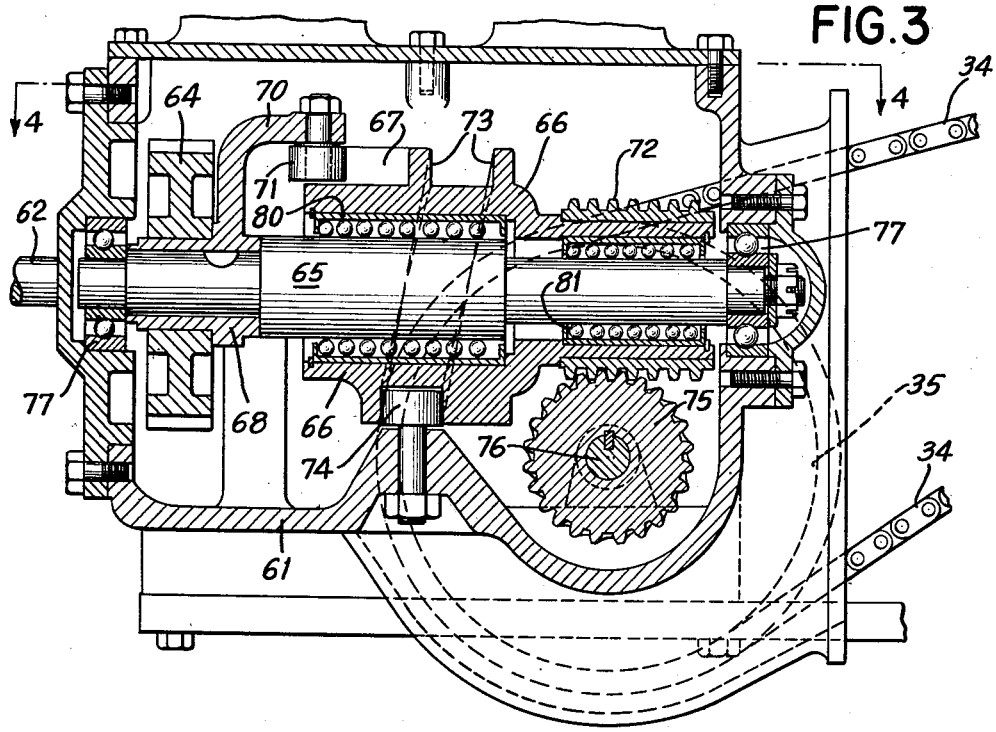
Figure 4:
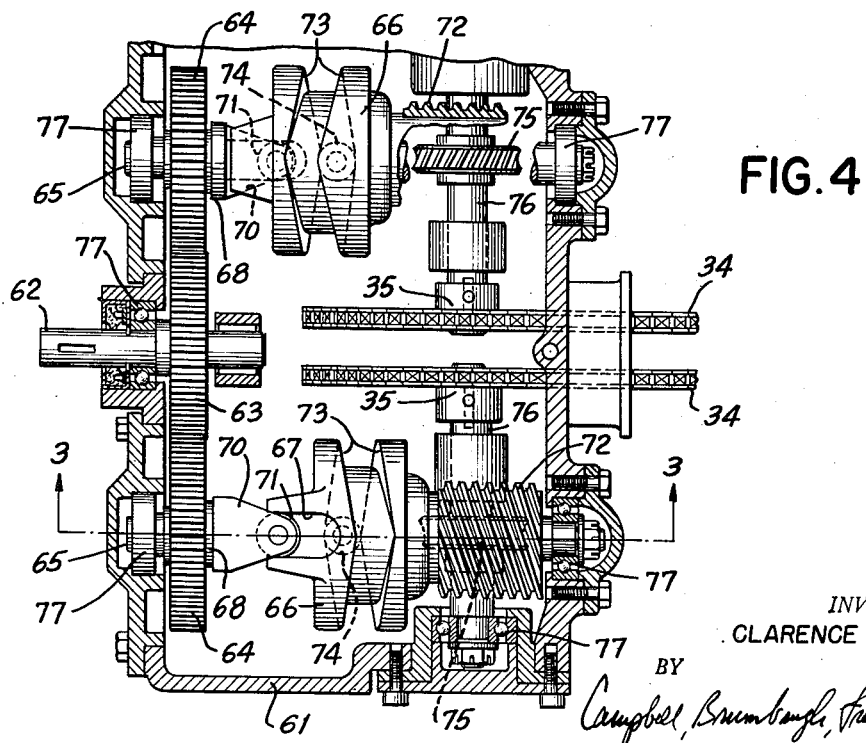

Figure 3 is a view in vertical section taken on the line 3—3 of Figure 4 looking in the direction of the arrows and showing part of the drive mechanism for the portion of the system shown in Figures 1 and 2; and Figure 4 is a view in horizontal section of the apparatus of Figure 3 taken on the line 4—4 and looking in the direction of the arrows.

Referring first to Figure 2 of the drawing, there are shown a pair of work output members in the form of substantially cylindrical rotor assemblies 11 and 11' disposed side by side each in communication with a separate inlet passage or chamber 5, such as that shown in Figure 1, formed in the housing 6. The chambers 5 are filled by a common inlet conduit 1 having disposed therein a suitable plastic-feeding mechanism such, for example, as a helical screw (not shown). The plastic-feeding means is adapted to operate continuously to introduce a constant and uniform flow of plastic material into the inlet passages 5 from which it is withdrawn continuously by the rotor assemblies 11 and 11'.

Each rotor assembly of the series may be identical in construction and, therefore, only one need be fully illustrated in the drawings and described in detail below. The rotor assembly 11 may include a diametrical aperture 14, preferably rectangular in shape as viewed in Figure 2 and in which is slidably received a double ended piston 15 having a total length which is less than that of the aperture by an amount defining a more or less rectangular cavity 16, when the piston is at either end of its stroke. Diametrically opposite the inlet passage 5 is an opening 10 which serves as a discharge station for the metered plastic masses. If desired, a packaging assembly 46 may be provided at the discharge station for the metered masses.

The piston member may be actuated by any suitable mechanism which will provide a controlled stroke during rotary movement of the rotor 11. In the illustrated mechanism the piston is provided in its central portion with a pair of rack sections 17 in back to back relationship. Meshing with the teeth of these rack sections 17 are a pair of segmental gears 18. The gears 18 are integral with or secured to spaced shafts 20 having portions which are journaled in suitable bushings 21 disposed in openings formed through the rotor 11, and extending in a direction parallel to the axis of rotation of the rotor. At their outer ends the shafts 20 have secured thereto arms 22 which also carry at their free ends roller followers 23. The roller followers 23 are actuated or controlled by an annular cam member 24. The curvature of the cam member is appropriate to cause the desired oscillation of one of the shafts and segmental gears to cause simultaneous intake of plastic material into one of the measuring pockets and the discharge of a formed mass from the opposite measuring pocket.

As may best be seen in Fig. 2, the rotor 11 is provided with a recess or counter-bore opening from the inner end adjacent the collar portion 12 to permit insertion of the segmental gears 18 and their shafts 20. To drive the rotor 11 a driving sleeve member 25, also insertible into the counter-bore of the rotor, is provided with a pair of hollow cylindrical sections 26 which extend inwardly to embrace end portions of the shafts 20 which have a reduced diameter. The sections 26 may be provided with suitable bushing members to provide bearing surfaces for these end portions of the shaft members 20. The exterior surfaces of the sections 26 are received in complementary rounded surfaces on the interior of the rotor to provide in effect a key or splined engagement so that when the driving sleeve member 25 is driven it will in turn drive the rotor. Exteriorly of the member 25 is a driving sprocket member 27 which is carried by and rotates with respect to a stub shaft 28 carried by a bracket member 30 mounted on the housing 6. Preferably the stub shaft 28 is secured to the bracket member 30 and also retains the sprocket member 27 thereon so that during normal disassembly of the apparatus for cleaning purposes, the sprocket member 27 need not be removed. In this way a unit will not get out of its adjusted predetermined timing with respect to other portions of the apparatus.

The sprocket member 27 carries a pair of driving pins 31 which are insertible into the bushings carried by the hollow sections 26 of the driving sleeve member 25. As shown in Fig. 2 these pin members 31 may be of different size and received in different sized holes in the sleeve member 25 to assure assembly of the same parts in the same relationship. To similarly properly locate the sleeve member 25 with respect to the rotor 11, the rotor may be provided with a locating pin (not shown) which may extend into an aperture or opening (also not shown) through the sleeve member 25. The sprocket 27 has entrained therearound a driving chain 34 which extends to a driving sprocket 35 disposed in the driving unit for the metering mechanism.

As the piston 15 is moved to expel the material from the cavity 16 a corresponding cavity is of necessity formed at the other end of the piston which will then be in communication with the inlet passage 5 and will receive a charge of plastic material.

The other rotor or rotors which are in communication with the inlet passage 5 are so arranged angularly with respect to the first rotor as to present at all times to the inlet passage 5 a cavity to be filled. In this fashion plastic material is continuously withdrawn from the inlet passage. By moving each sequence of measuring cavities with a variable speed operating cycle so that they move at a decelerated speed through the intake and discharge zones, and at an accelerated speed between zones, plastic material may be flowed at a substantially continuous and uniform rate.

Figures 3 and 4 illustrate a driving unit which will provide the proper variations within the operating cycle for each of two rotors or metering heads. Since the metering heads or rotors operate out of phase with respect to each other, two driving units are provided which are driven from a common source. For purposes of clarity, the driving systems will be described in detail herein with like reference numerals being utilized to identify like components in the companion driving system.

The power for the unit may be supplied from any suitable source to a main drive shaft 62 which enters the casing 61 and carries a driving gear 63. The gear 63 meshes with and drives a pair of gears 64, each of which is mounted on a driving shaft 65 for each drive unit. Also mounted on each shaft 65 is a sleeve member 66 which is provided with an axially extending guideway 67. As may best be seen in Figure 4, the gear 64 is secured to a collar 68 keyed to the shaft 65 and the collar 68 has a projecting arm 70 carrying a roller 71 which is disposed in the guideway 67. Thus, the rotary power supplied to the gear 64 and the shaft 65 is transmitted to the sleeve 66 by the arm 70 and roller 71. The sleeve 66 carries a suitable gear in the form of a worm 72 secured thereon and is also provided with a peripherally extending cam track 73.

The casing 61 has a stationary cam roller 74 projecting from its interior and received in the cam track 73. During rotation of the shaft 65 and the sleeve 66, the stationary cam roller 74 acting in the cam track 73 causes translatory or axial movement of the sleeve 66 and the worm 72 along the shaft 65. The guideway 67 of the sleeve 66, in cooperation with the roller 71 permits this axial movement of the sleeve 66 while torque is being transmitted by the roller 71 to the sleeve 66. The worm 72 meshes with and drives a worm gear 75 which is mounted for rotation on a driven shaft 76 journaled in the casing 61. The driven shaft 76 also carries the driving sprocket 35 which is connected to drive the metering head by the chain 34, as described.

It may be noted that if, during the rotation of the sleeve 66 and the worm 72, the cam track 73 angles at an angle approaching the lead angle of the worm, the axial movement of the cam and worm along the shaft 65 will prevent the worm from exerting its full driving effect on the worm gear 75, and the driven shaft 76 will rotate at a slower speed. Movement of the sleeve 66 and the worm 72 in the opposite axial direction will cause the worm gear 75 and driven shaft 76 to rotate at an increased rotary speed. The angularity of the cam track 73 and the peripheral extent of the angularity of the cam track will control the amount of drive transmitted by the worm to the worm gear and will thus control the speed and the variations of speed of the driven shaft 76.

By a suitable configuration of the cam track almost any desired condition can be obtained. For example, the driven shaft 76 may be caused to dwell or pause for as long as about three-quarters of a revolution or may be made to have other deceleration and acceleration characteristics for desired time periods. Since the cam track 73 is a closed track and returns to its initial position during each revolution of the shaft 65, the driven shaft 76 will undergo a complete operating cycle for each revolution of the driving shaft 65. Further, the desired speed variations within a cycle may be transmitted by the axial movements of the sleeve 66 and worm 72 as controlled by the configuration of the cam track 73.

As previously stated it is desirable to actuate the rotor so that the measuring cavities are caused to move slowly through their intake and discharge zones and then to move at an increased rate in traveling between stations. To accomplish this desired motion and to obtain a substantially continuous and uniform columnar flow of plastic material from the source of supply it is preferable to provide two or more sequences of measuring cavities adjacent a common source of supply with the sequences having the same operating cycle but out of phase with each other. As a measuring cavity of one sequence ceases taking plastic material from the source of supply, a measuring cavity of the other sequence begins to receive plastic material from the source of supply.

The driving unit described permits a great amount of flexibility in operating cycle and is extremely useful for obtaining the desired effects at the driven end. The variation described whereby the molding cavities are caused to move at a decelerated speed through their intake and discharge stations and at an accelerated speed therebetween may be readily changed by modifying the configuration of the cam track 73. It may be desirable, for example, to provide for decelerated travel of the molding cavities as they move adjacent the opening 36 where each charge of plastic material is compressed to a predetermined volume against a predetermined force. For some plastic materials other variations may be desirable.

With the use of a dual-acting piston, the rotor 11 may be caused to complete an operating cycle in one half a revolution. At the same time the driving shaft 65 may rotate one complete revolution for the same cycle and accordingly an overall reduction of 2 to 1 is desirable for the form of the invention described. For practical reasons, it is preferable that the gear reduction between the worm and the worm gear be greater.

An especially advantageous combination is to utilize a four or six thread worm with a sixteen or twenty-four tooth worm gear effecting a reduction of four to one, that is, the driving shaft 65 must make four revolutions to obtain a single revolution of the driven shaft 76. Then by selecting the sprockets 35 and 27 so that one revolution of the sprocket 35 will produce two revolutions of the sprocket 27, an appropriate overall ratio is obtained, that is, the sprocket 27 and the rotor 11 will make half a revolution (or one cycle) for each revolution of the driving shaft 65. Obviously, other ratios may be used to produce desired effects, it being important to note that by proper selection of parts and configuration of the cam track 73, the desired number of speed variations may be introduced within a revolution or cycle of the driving shaft 65 and these variations may be multiplied the desired even, odd or fractional number of times to produce an appropriate number of cycles and appropriate intra-cycle variations at the operating or driven portion of the apparatus.

It is contemplated that an excellent operating cycle is produced if each measuring cavity moves at its decelerated speed while the rotor moves for an arcuate distance of about 30° during half a revolution of the shaft 65. Thus, the filling and expulsion of plastic material may occur while the rotor and measuring cavity are moving relatively slowly. For the other half of its cycle (or 150°), the measuring cavity may be moved at its accelerated rate and the shaft 65 will make half a revolution. With the measuring cavities of the adjacent sequence moving in a similar cycle but out of phase, a measuring cavity will always be in communication with the intake station, receiving plastic material from the source of supply and a substantially continuous and uniform flow of plastic material will result. As each measuring cavity is receiving plastic material, its opposite or counterpart is adjacent the discharge station and a measured mass is being expelled therefrom.

It will be understood that the cam tracks 24, which are responsible for the actuation of the pistons 15 with the rotor assemblies, are arranged in accordance with the disclosure of the said copending application, Serial No. 152,549, to actuate the pistons to cause masses of the plastic to be received in and expelled from the cavities 16 when the latter are disposed at the infeed and discharge stations 5 and 10, respectively.

To decrease friction in the driving unit, the shafts 62, 65 and 76 may be journaled in suitable anti-friction roller or ball bearings as indicated by the numeral 77 in Figures 3 and 4. This will reduce the friction during rotation of the shafts to a minimum. It is also desirable to minimize the friction due to the axial movement of the sleeve 66. To accomplish this purpose suitable lineal ball bearing bushings may be utilized between the sleeve 66 and the shaft 65 as indicated by the numerals 80 and 81 in Figure 3. Sliding anti-friction bearings of this type are disclosed in the Ferger patent, No. 2,452,117, granted October 26, 1948.

The particular form of the invention here described and illustrated in the accompanying drawings is presented as an example of how the invention may be applied. Other forms, embodiments and applications of the invention coming within the proper scope of the following claims will readily suggest themselves to those skilled in the art.

I claim:

1. In apparatus for producing measured masses of plastic material, a plurality of members movable through a common filling zone and through discharge zones spaced therefrom, at least one cavity in each member, means associated with the respective cavities and responsive to movement of the members to control the ingress and egress of the plastic material, the material thereby being caused to be received by the cavities at the filling zone and expelled at the discharge zones, and driving means for moving said members to cause the cavities therein to be moved alternately between the filling and discharge zones, said driving means including a plurality of motion modifier means to accelerate the respective members when the cavities are between zones and to decelerate the members when the cavities are in the filling zone, said motion modifying means being relatively phased to drive the members in out of phase relationship to cause at least one cavity to be disposed in the filling zone at all times, whereby a continuous flow of plastic material may be maintained at the filling zone.

2. Apparatus according to claim 1 in which the movable members comprise rotors and the cavities are formed by diametrical bores therein, said means to control ingress and egress of plastic material comprising piston means mounted in the respective bores.

3. Apparatus according to claim 1, said driving means for the movable members comprising a series of rotary input members, a series of first gear means driven respectively by the input members, a series of second gear means engaged respectively by the first gear means, means connecting the second gear means respectively to the said movable members to drive the latter, whereby the rotary motion of the input members is transmitted to the movable members, said motion modifying means effecting intracycle speed variations in the transmitted motion to the members comprising a series of means to shift the gear means of at least one series in translation to alternately add to and subtract from the transmitted motion, said movable members thereby being moved in out of phase intracycle speed variations to accelerate the cavities between zones and to decelerate the cavities in the filling zone.

4. Apparatus according to claim 3, said means to shift the gear means in translation comprising a series of rotary cams connected to turn with the respective input members, the cam tracks of the respective cams being out of phase, and a series of cam followers connected respectively to the gear means which are movable in translation.

5. Apparatus according to claim 4, the first gear means comprising a worm and the second a worm gear, the worm being mounted for axial movement in translation, said cam followers being connected respectively to drive the worms in translation.

6. Apparatus for driving a series of rotary members with intracycle speed variations including a series of driving units each including a driving shaft, a sleeve mounted to turn with the driving shaft and to move axially with respect thereto, a cylindrical cam connected to the sleeve to afford predetermined axial movement of said sleeve during rotation thereof, a first gear connected to rotate and move axially with the sleeve, a second gear in meshing engagement with the first gear member and mounted for rotary movement, a driving connection between respective second gears and said rotary members, and common drive means for each of said shafts, whereby the respective cams may be phased to cause the rotary members to be driven in any desired phase relationship.

7. Apparatus for driving a series of rotary members, comprising driving means for each of said members, each of said driving means including a driving shaft, a sleeve mounted for movement in an axial direction with respect to said shaft, lineal ball bearing bushings between said sleeve and shaft, a worm carried by said sleeve, a cylindrical cam track carried by said sleeve, a stationary follower disposed in said cam track to control axial movement of said sleeve, guide means carried by said sleeve, a member carried by said driving shaft disposable in said guide means to rotate said sleeve with said driving shaft while permitting axial movement of said sleeve, a worm gear in engagement with said worm, a driven shaft carrying said worm gear, and means for connecting the driven shafts respectively to the said rotary members.

8. Apparatus according to claim 3, in which the movable members are formed with through-bores, said means to control ingress and egress of plastic material comprising piston means mounted in the respective through-bores, said piston means being double-ended to present one working surface at one end of the through-bore and another working surface at the other end of the through-bore, whereby one working surface of the piston means acts to draw plastic material into the through-bore at one end while the other working surface acts to expel plastic material from the through-bore at the other end.

9. In apparatus for producing measured masses of plastic material, a plurality of members, each movable through a filling zone and through a discharge zone spaced therefrom, the filling zones being in communication with a common source of supply of the plastic material, at least one cavity in each member, means associated with the respective cavities and responsive to movement of the members to control the ingress and egress of the plastic material, the material thereby being caused to be received by the cavity of one of said members at the filling zone and expelled at the discharge zone, and driving means for moving said members to cause the cavities therein to be moved alternately between the filling and discharge zones, said driving means including a plurality of motion modifier means to accelerate the respective members when the cavities are between zones and to decelerate a member when the cavity is in the filling zone, said motion modifying means being relatively phased to drive the members in out of phase relationship to cause at least one cavity to be disposed in its filling zone at all times, whereby a continuous flow of plastic material may be maintained from the source of supply.

References Cited in the file of this patent

UNITED STATES PATENTS

| | | |
|---|---|---|
| 1,158,339 | Van Houten | Oct. 26, 1915 |
| 1,234,771 | Kiewicz | July 31, 1917 |
| 1,641,498 | Lass | Sept. 6, 1927 |
| 1,840,578 | Garvey | Jan. 12, 1932 |

FOREIGN PATENTS

| | | |
|---|---|---|
| 323,412 | Italy | Dec. 20, 1934 |